Dec. 20, 1960   F. J. MIDDLESTADT   2,964,998
PRECISION LIGHT APERTURE ARRANGEMENT
Filed Oct. 3, 1958
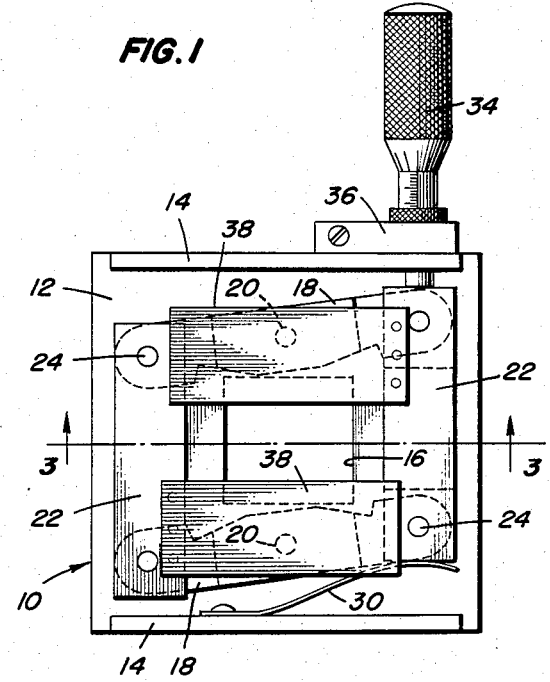
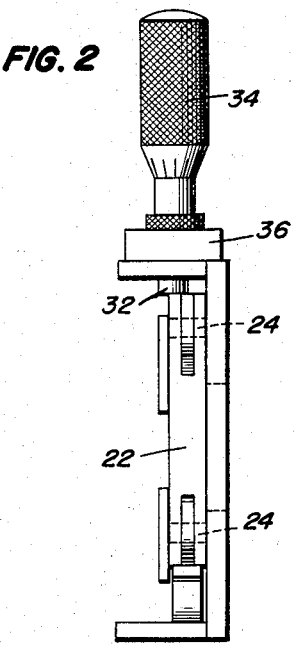
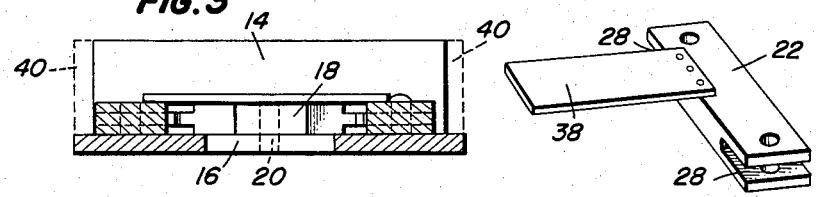
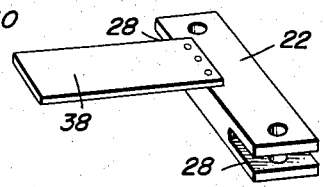
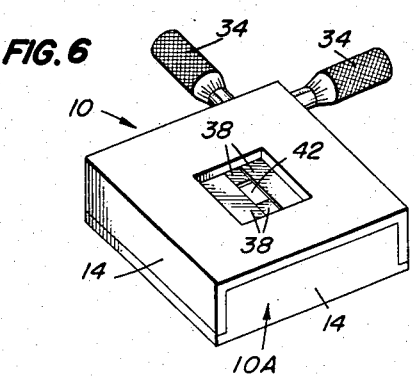
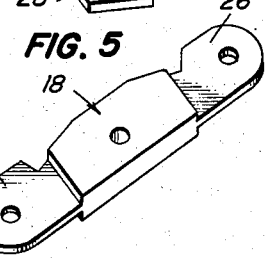
INVENTOR
Fred J. Middlestadt
BY Walter G. Finch
ATTORNEY

United States Patent Office 2,964,998
Patented Dec. 20, 1960

2,964,998

PRECISION LIGHT APERTURE ARRANGEMENT

Fred J. Middlestadt, 602 Kingston Road, Baltimore, Md.

Filed Oct. 3, 1958, Ser. No. 765,116

4 Claims. (Cl. 88—61)

This invention relates generally to optical devices, and more particularly it pertains to precision apertures for use with spectrometric instruments.

In the science of optics, it is very often required to reduce a beam of light or other radiation to a precisely dimensioned beam by passing it through a slit. It is also of advantage to provide a calibrated control therefor. Furthermore, it is of great convenience that the aperture be adjustable symmetrically with regard to its closed or central position.

Still another convenience in optical work with slits is the ability to control the slit dimensions in two directions. Heretofore, optical slits have been lacking in these desirable properties in one or several ways, or undesirable interlocking of the above-mentioned characteristics were present.

It is, therefore, an object of the present invention to provide a precision calibrated aperture for use with spectrometric instruments which opens and closes symmetrically about a center line.

It is another object of this invention to provide a precision aperture which can be stacked upon a similar aperture to provide precision two-dimensional control and additionally provide a light-tight and dust-proof enclosure therefor.

These and other objects and advantages of this invention will become more readily apparent and understood from the accompanying specification and drawings in which:

Fig. 1 is a side elevation of a precision optical aperture incorporating features of this invention;

Fig. 2 is an end elevation of the precision aperture of Fig. 1;

Fig. 3 is a cross-section viewed in the direction of arrows 3—3 of Fig. 1;

Fig. 4 is a perspective view of a shutter arm for the precision aperture, showing the assembly of a shutter;

Fig. 5 is a perspective view of a centrally pivoted link for the precision aperture; and Fig. 6 is a perspective view of an assembly consisting of two precision apertures.

Referring now to Fig. 1 of the drawings, there is illustrated an aperture assembly 10, whose basic structure consists of a flat plate housing 12 having a pair of opposite top and bottom sides 14. Housing 12 is provided centrally with a window 16 cut therethrough. A pair of spaced centrally pivoted links 18, are arranged upon fixed pivot pins 20 secured in housing 12. One of these links 18 is illustrated in detail in Fig. 5. Links 18 join a pair of shutter arms 22, as best shown in Fig. 1 and in detail in Fig. 4. These shutter arms 22 are secured to the links 18 by means of movable pivot pins 24.

As illustrated in Figs. 4 and 5, fitting of link 18 to arm 22 is facilitated by provision of a tongue 26 and a groove 28 machined in the two parts respectively.

The resulting rhomb structure, consisting of the pair of links 18 and the pair of arms 22, is urged upwardly on one side by a leaf spring 30 secured to one side 14 of the housing 12. This upward urge of the rhomb structure is resisted by a finger 32 of a micrometer head 34 which is secured by means of a clamp 36 to the opposite side 14 of the housing 12. A pair of shutters 38 is welded as shown to the opposing shutter arms 22 in spaced parallel relationship to each other.

It can be seen from the construction illustrated in Fig. 1 that as the right shutter arm 22 is moved downwardly by the thrust of finger 32 of micrometer 34, by pivotal action of the left shutter arm 22 moves upwardly. Shutters 38 are thereby moved in continuous parallelism toward each other at the same rate until they form a line of contact between themselves to obstruct all passage of light through window 16 of the housing 12.

As shown in Fig. 3, by removing a portion 40 of the sides 14 of housing 12, a modified aperture assembly 10 can be nested to an inverted and 90° rotated unmodified assembly 10A as shown in Fig. 6 to provide a crossed two-dimension variable aperture 42 housed in a resulting light-tight and dust-proof enclosure.

If the micrometer head 34 is set for zero, at this closure point, it will thereafter read exactly one-half of the slit dimension formed by shutters 38 for any desired opening of the aperture.

Obviously, many other modifications and variations of the present invention are possible in the light of the above teachings. It is therefore to be understood that within the scope of the appended claims the invention may be practiced otherwise than as specifically described.

What is claimed is:

1. A precision aperture arrangement for use with a spectrometric device, comprising, a rectangular shaped flat base structure having a substantially rectangular shaped window provided therein, an adjustable rhomb structure pivotally mounted to said base structure for enclosing said window thereof, said rhomb structure consisting of a pair of parallel spaced links pivotally and centrally mounted to said base structure but located on one pair of opposite sides of said window, each said link having a tongue formed at opposite ends thereof, and a pair of parallel spaced arms located on the other pair of opposite sides of said window, each said arm being grooved at the opposite ends thereof, each grooved end of each said arm receiving a mating tongue end of its adjacent link and being pivotally connected thereto; a pair of parallel, spaced shutter elements each having an opposite end secured to one of the opposite arms of said rhomb structure, means including a spring for biasing said rhomb structure at one tongue and grooved end thereof so as to vary the distance between said parallel shutter elements, and means including a micrometer mechanism having one end thereof in engagement with a tongue and grooved end of said biased rhomb structure directly in alignment with the first mentioned tongue and grooved end thereof for biasing said rhomb structure and for determining the distance between said pair of parallel shutter elements.

2. An arrangement as recited in claim 1, wherein a second pair of parallel, spaced shutter elements are arranged substantially transversely to said first pair of parallel, spaced shutter elements, and means for adjusting said second pair of shutter elements, whereby a two-dimensional variable aperture is obtained.

3. An arrangement as recited in claim 2, wherein the means for adjusting said second pair of shutter elements includes a second rhomb structure pivotally mounted to said base structure, a second biasing means mechanically associated with said second rhomb structure to vary the distance between said pair of parallel shutter elements, and a second micrometer mechanism for determining the distance between said second pair of parallel shutter elements.

4. An arrangement as recited in claim 1, wherein said micrometer mechanism is positioned off-axis with respect to said rhomb structure and arranged to engage said rhomb structure so as to bias it in a direction opposite to that of said biasing means.

References Cited in the file of this patent

UNITED STATES PATENTS

| | | |
|---|---|---|
| 1,390,246 | Leonard | Sept. 6, 1921 |
| 1,455,825 | Wood | May 22, 1923 |
| 2,485,089 | Fassin | Oct. 18, 1949 |
| 2,844,069 | Azarraga | July 22, 1958 |

OTHER REFERENCES

Strong: "On an Optical Slit," Review of Scientific Instruments, vol. 12, 1941, pages 213–214.